United States Patent
Handy Bosma et al.

(10) Patent No.: US 10,778,792 B1
(45) Date of Patent: Sep. 15, 2020

(54) PROVIDING USER CONTROL OF TRACKING USER BEHAVIOR

(71) Applicant: International Business Machines Corporation, Armonk, NY (US)

(72) Inventors: John Handy Bosma, Leander, TX (US); Jeremy R. Fox, Georgetown, TX (US); Leanna Holmquist, Austin, TX (US); Juan Leon, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/371,426

(22) Filed: Apr. 1, 2019

(51) Int. Cl.
*H04L 29/08* (2006.01)
*G06F 16/957* (2019.01)

(52) U.S. Cl.
CPC .......... *H04L 67/22* (2013.01); *G06F 16/9574* (2019.01); *H04L 67/146* (2013.01); *H04L 67/20* (2013.01)

(58) Field of Classification Search
CPC ....... H04L 67/22; H04L 67/146; H04L 67/20; G06F 16/9574
See application file for complete search history.

(56) References Cited

U.S. PATENT DOCUMENTS

| | | |
|---|---|---|
| 6,851,060 B1 | 2/2005 | Shrader |
| 7,660,737 B1 | 2/2010 | Lim et al. |
| 8,468,271 B1 | 6/2013 | Panwar et al. |
| 8,578,036 B1 | 11/2013 | Holfelder et al. |
| 9,152,820 B1 | 10/2015 | Pauley, Jr. et al. |
| 2003/0051157 A1 | 3/2003 | Nguyen et al. |
| 2007/0038765 A1 | 2/2007 | Dunn |
| 2007/0088603 A1 | 4/2007 | Jouppi et al. |
| 2008/0263627 A1 | 10/2008 | Berteau et al. |
| 2009/0073885 A1* | 3/2009 | Jalil .................... H04L 67/2838 370/241 |

(Continued)

OTHER PUBLICATIONS

Amy Onorato, "Cookies and Consent: How GDPR Impacts Online Tracking," DMNews.com, https://www.dmnews.com/retail/article/13034543/cookies-and-consent-how-gdpr-impacts-online-tracking, May 25, 2018, pp. 1-4.

(Continued)

*Primary Examiner* — Arvin Eskandarnia
(74) *Attorney, Agent, or Firm* — Robert A. Voigt, Jr.; Winstead PC

(57) ABSTRACT

A method, system and computer program product for providing user control of tracking user behavior. A request from a tracking implementer (e.g., website) for installing content (e.g., tracking cookies) on a user's computing device for tracking user behavior is detected. Alternatively, the installation of content by the tracking implementer on the user's computing device to track user behavior is detected. If the user had previously established a standard terms of service for the tracking implementer to abide in order to track the user's behavior, then a determination is made as to whether the tracking implementer agreed to accept such standard terms of service. If the tracking implementer did not agree to accept such standard terms of service, then the tracking implementer is blocked from tracking the user's online behavior, including blocking the tracking implementer from installing content on the user's computing device to track the user's behavior.

20 Claims, 5 Drawing Sheets

(56) References Cited

U.S. PATENT DOCUMENTS

| | | |
|---|---|---|
| 2013/0254649 A1 | 9/2013 | O'Neill et al. |
| 2018/0082251 A1* | 3/2018 | Wilkinson ......... G06Q 30/0635 |
| 2018/0082352 A1* | 3/2018 | Mattingly .......... G06Q 30/0633 |
| 2018/0082353 A1* | 3/2018 | Mattingly ............ G06Q 10/087 |
| 2018/0089452 A1* | 3/2018 | Aralikatte ........... G06F 11/3438 |

OTHER PUBLICATIONS

CNBC, "Amazon has Big Plans for Alexa Ads in 2018; It's Discussing Options with P&G, Clorox and Others," https://www.cnbc.com/2018/01/02/amazon-alexa-is-opening-up-to-more-sponsored-product-ads.html, Jan. 2, 2018, pp. 1-6.

OneTrust, "Nobody Likes Cookie Pop-Ups: Browser-Based Consent and the ePrivacy Regulation," https://www.onetrust.com/nobody-likes-cookie-pop-ups-browser-based-consent-eprivacy-regulation, Feb. 22, 2017, pp. 1-2.

Millett et al., "Cookies and Web Browser Design: Toward Realizing Informed Consent Online," Proceedings of the SIGCHI Conference on Human Factors in Computing Systems, ACM, 2001, pp. 46-52.

\* cited by examiner

PROVIDING USER CONTROL OF TRACKING USER BEHAVIOR

TECHNICAL FIELD

The present invention relates generally to tracking user behavior, and more particularly to providing user control of tracking user behavior.

BACKGROUND

Web and mobile application users are subjected to ubiquitous tracking and personalization.

There are a number of different techniques utilized by trackers (referred to herein as "tracking implementers") who attempt to track user behavior as the user accesses various websites. One such technique is via the use of a "tracking cookie."

Tracking cookies are specialized versions of cookies that tracking implementers use to monitor user entries and online habits. For example, the tracking cookie may be used to send a list of the user's online activities, usually tied to the user's Internet Protocol (IP) address, to the tracking implementer's remote database for analysis.

Another technique used by tracking implementers to monitor user behavior is to store user behavior data in the user's local browser storage. Data placed in the local browser storage is per origin, where the data is available to all scripts loaded from pages from the same origin, and persists after the browser is closed.

Such tracked user behavior data may be utilized by the tracking implementers or third-parties to help businesses make effective decisions about advertising and outreach to the user, such as presenting targeted advertisements to the user.

SUMMARY

In one embodiment of the present invention, a method for providing user control of tracking user behavior comprises detecting a request from a tracking implementer to install content on a user's computing device, where the installed content is used to track user behavior. The method further comprises determining whether the tracking implementer previously agreed to accept a standard terms of service for tracking the user behavior in response to user previously establishing the standard terms of service for tracking the user behavior by the tracking implementer. The method additionally comprises blocking the tracking implementer from installing content on the user's computing device in response to the tracking implementer not previously agreeing to accept the standard terms of service for tracking the user behavior. Furthermore, the method comprises permitting the tracking implementer to install content on the user's computing device in response to the tracking implementer previously agreeing to accept the standard terms of service for tracking the user behavior.

Other forms of the embodiment of the method described above are in a system and in a computer program product.

In another embodiment of the present invention, a method for providing user control of tracking user behavior comprises detecting a tracking implementer installing content on a user's computing device to track user behavior. The method further comprises determining whether the tracking implementer previously agreed to accept a standard terms of service for tracking the user behavior in response to user previously establishing the standard terms of service for tracking the user behavior by the tracking implementer. The method additionally comprises blocking the tracking implementer from tracking the user behavior in response to the tracking implementer not previously agreeing to accept the standard terms of service for tracking the user behavior. Furthermore, the method comprises permitting the tracking implementer to track the user behavior in response to the tracking implementer previously agreeing to accept the standard terms of service for tracking the user behavior.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for providing user control of tracking user behavior. In one embodiment of the present invention, a request from a tracking implementer (e.g., website) to install content on a user's computing device for tracking user behavior is detected. Alternatively, the installation of content on the user's computing device by the tracking implementer to track user behavior is detected. "Tracking implementer," as used herein, refers to any entity (e.g., website, content provider, marketing provider) configured with the ability to track online user behavior via any means. If the user had previously established a standard terms of service for the tracking implementer to abide in order to track the user's behavior, then a determination is made as to whether the tracking implementer agreed to accept such standard terms of service. If the tracking implementer did not agree to accept such standard terms of service, then the tracking implementer is blocked from installing content (e.g., tracking cookies) on the user's computing device (e.g., web browser) to track the user's behavior. Alternatively, if the tracking implementer did not agree to accept such standard terms of service, then the tracking implementer is blocked from tracking the user's online behavior, such as by blocking the execution of code or deleting the installed content (e.g., tracking cookies) on the user's computing device. The user may then be informed that consent to the tracking will be blocked until the user has indicated acceptance to the tracking. In this manner, the present invention provides the user control over tracking the user's behavior, such as by blocking the tracking of user's behavior until the tracking implementer agrees to the terms that are satisfactory to the user, such as limiting the types of actions to be tracked, compensating the user for acquiring personal data associated with such tracking, etc.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
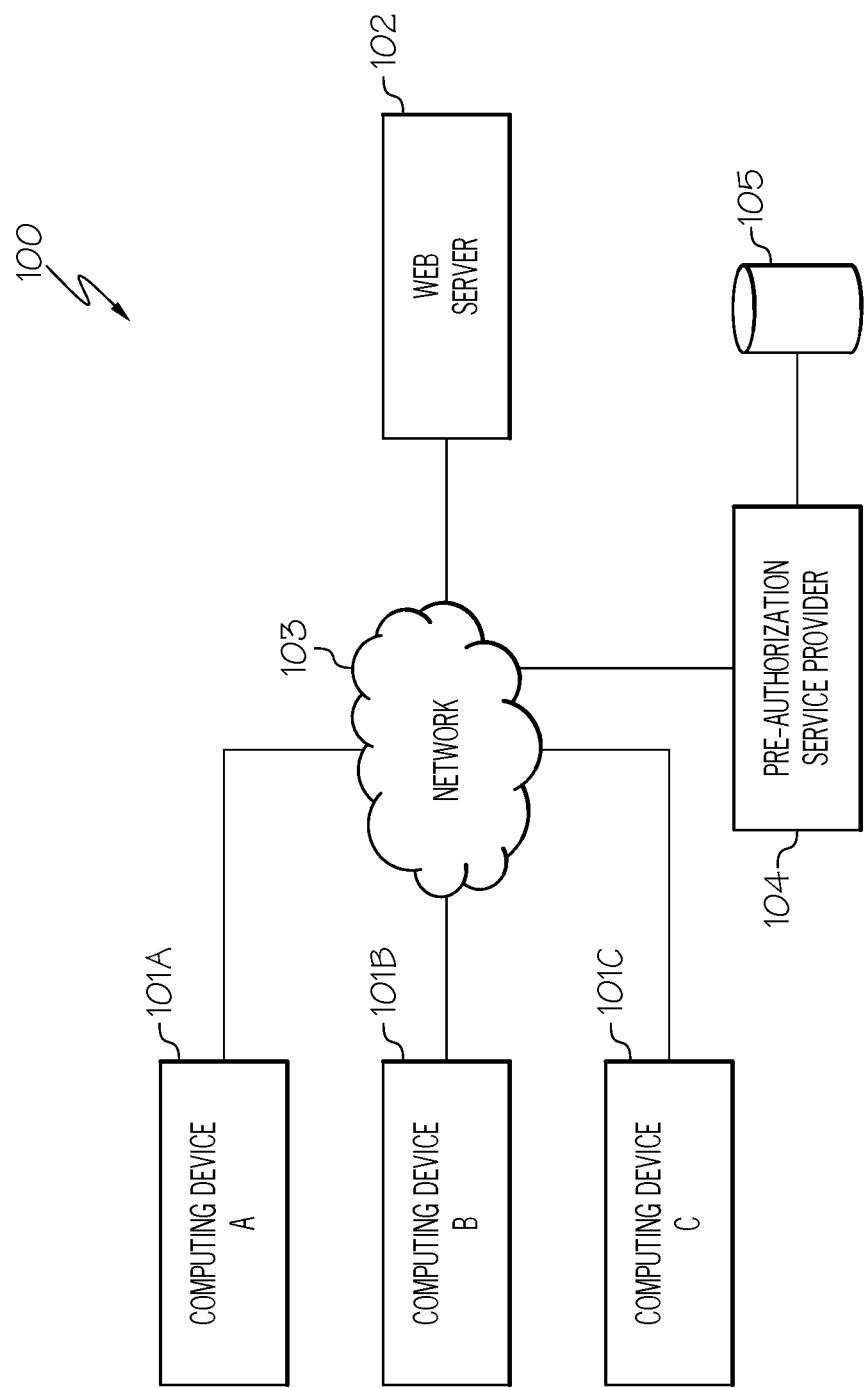
FIG. 1 illustrates a communication system configured in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a web server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and web server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Web server 102 is configured to host websites and serve contents to the World Wide Web. Furthermore, web server 102 is configured to process incoming network requests over HTTP (Hypertext Transfer Protocol) and several other related protocols.

System 100 further includes what is referred to herein as a "pre-authorization service provider" 104 connected to network 103 by wire or wirelessly. Pre-authorization service provider 104 is configured to provide user control of content installation (e.g., tracking cookies) by tracking implementers (e.g., websites hosted by web server 102), such as by enabling the tracking of user behavior by the tracking implementer installing content (e.g., tracking cookies) on the user's computing device 101 only after the tracking implementer agreed to accept the standard terms of service, which may have been previously established by the user 101 or a government entity. Additionally, pre-authorization service provider 104 provides user control of tracking user behavior by detecting the tracking implementer installing content (e.g., tracking cookies) on the user's computing device 101 to track the user's behavior and blocking further tracking until the tracking implementer agrees to accept the standard terms of service, which may have been previously established by the user 101 or a government entity. A "tracking implementer," as used herein, refers to any entity (e.g., website, content provider, marketing provider) configured with the ability to track online user behavior via any means, such as via tracking cookies or storing online behavior on the user's local browser storage to be later retrieved by the tracking implementer. Such tracking may also include Internet of Things tracking.

In one embodiment, pre-authorization service provider 104 provides an application programming interface (API) for tracking implementers to retrieve the number of users currently blocking tracking of different types of data so that they can be aware of the potential loss of data resulting from not being able to track the online behavior of such users. In one embodiment, upon the tracking implementer agreeing to accept the standard terms of service, pre-authorization service provider 104 may initiate an authenticated API for the tracking implementer to use to make an offer of compensation to those users 101 who selected such standard terms of service in order for those users 101 to consent to tracking their online behavior. In one embodiment, pre-authorization service provider 104 aggregates all such offers and makes them available to users 101.

In one embodiment, pre-authorization service provider 104 accepts a consent action globally across all tracking implementers or accepts consent on a granular basis by the tracking implementer. A consent action may cause a change in the value of a bit to unblock the tracking thereby allowing the tracking implementer to track the user's behavior independently.

In one embodiment, the user's behavior may be tracked by pre-authorization service provider 104 to enforce the accepted terms of service, including ensuring that user 101 is compensated for the use of data related to the tracking of the user's behavior.

In one embodiment, pre-authorization service provider 104 may present various standard service agreements to user 101 to select. For instance, user 101 may be presented with multiple service agreements for controlling the tracking of user's behavior, where each service agreement may have different terms of service, such as different types and/or levels of compensation, different types of data or user behavior being allowed to be tracked, etc. In one embodiment, user 101 designates the tracking implementer(s) to be bound by the selected service agreements. In one embodiment, such designated tracking implementers and user-selected service agreements, upon which the designated tracking implementers are to be bound, are stored in a database 105 connected to pre-authorization service provider 104.

A further description of the functionality of pre-authorization service provider 104 is provided below in connection with FIGS. 3-5. A description of the hardware configuration of pre-authorization service provider 104 is provided below in connection with FIG. 2.

System 100 is not to be limited in scope to any one particular network architecture. System 100 may include any number of computing devices 101, web servers 102, networks 103, pre-authorization service providers 104 and databases 105. Furthermore, while FIG. 1 illustrates pre-authorization service provider 104 as being a separate physical device, some or all of the functionality of pre-authorization service provider 104 may reside in computing device 101.

Figure 2:
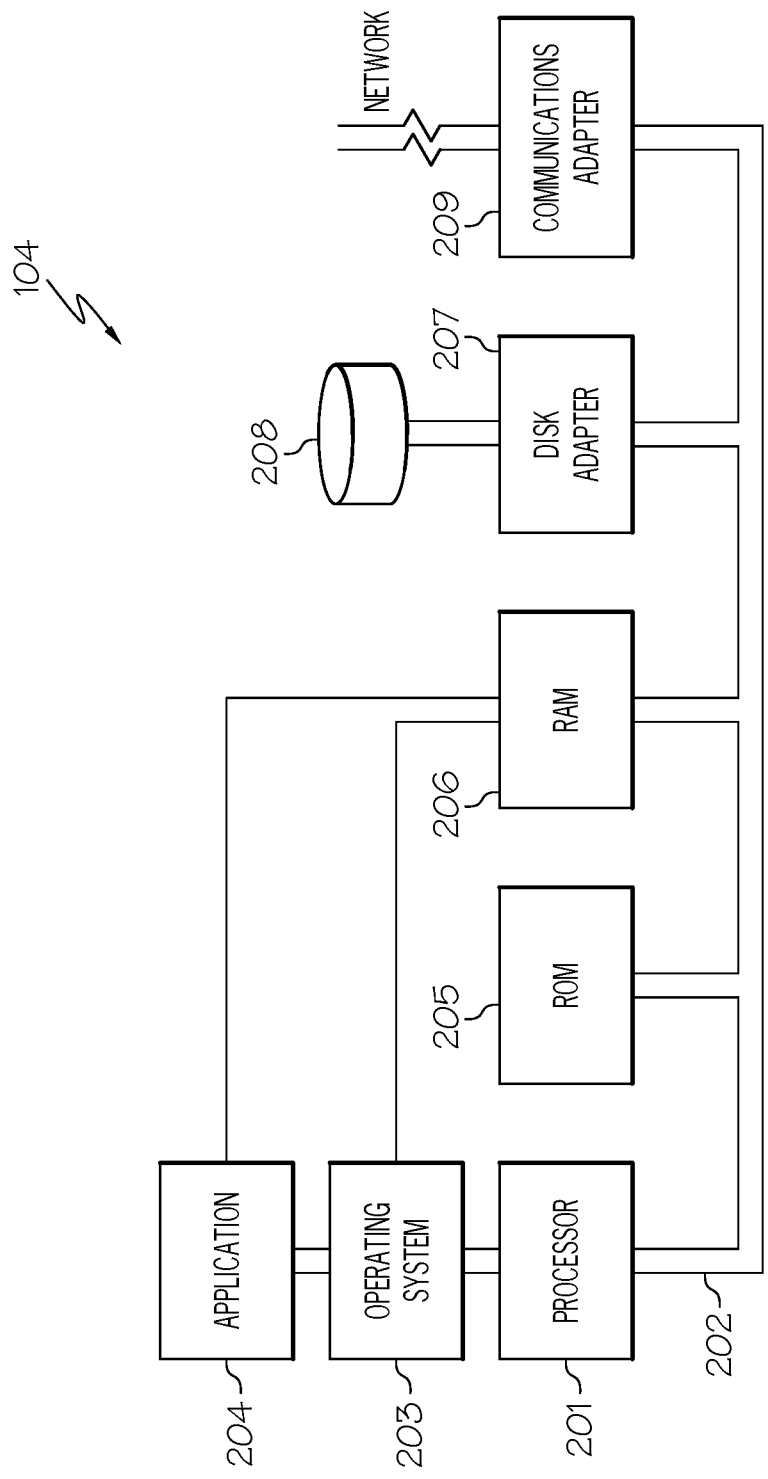
FIG. 2 illustrates an embodiment of the present invention of a hardware configuration of a pre-authorization service provider which is representative of a hardware environment for practicing the present invention.

Referring now to FIG. 2, FIG. 2 illustrates a hardware configuration of pre-authorization service provider 104 (FIG. 1) which is representative of a hardware environment for practicing the present invention. Referring to FIG. 2, pre-authorization service provider 104 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for providing user control of tracking user behavior by tracking implementers (e.g., websites) as discussed below in association with FIGS. 3-5.

Referring again to FIG. 2, read-only memory ("ROM") 205 is connected to system bus 202 and includes a basic input/output system ("BIOS") that controls certain basic functions of pre-authorization service provider 104. Random access memory ("RAM") 206 and disk adapter 207 are also connected to system bus 202. It should be noted that software components including operating system 203 and application 204 may be loaded into RAM 206, which may be pre-authorization service provider's 104 main memory for execution. Disk adapter 207 may be an integrated drive electronics ("IDE") adapter that communicates with a disk unit 208, e.g., disk drive. It is noted that the program for providing user control of tracking user behavior by tracking implementers, as discussed below in association with FIGS. 3-5, may reside in disk unit 208 or in application 204.

Pre-authorization service provider 104 may further include a communications adapter 209 connected to bus 202. Communications adapter 209 interconnects bus 202 with an outside network (e.g., network 103 of FIG. 1) thereby allowing pre-authorization service provider 104 to communicate with computing devices 101 and web server 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are a number of different techniques utilized by trackers (referred to herein as "tracking implementers") who attempt to track user behavior as the user accesses various websites. One such technique is via the use of a "tracking cookie." Another technique used by tracking implementers to monitor user behavior is to store user behavior data in the user's local browser storage. Data placed in the local browser storage is per origin, where the data is available to all scripts loaded from pages from the same origin, and persists after the browser is closed. Such tracked user behavior data may be utilized by the tracking implementers or third-parties to help businesses make effective decisions about advertising and outreach to the user, such as presenting targeted advertisements to the user. Tracked user behavior data may be resold, repackaged and reintegrated in ways that are unexpected and opaque to the users, who may not agree to such actions if they understood how their data was being used. To some users, such practices are an invasion of privacy. Furthermore, economic benefits primarily accrue to those implementing tracking with users having little knowledge of the economic value of their data to those who implement tracking or purchase the tracked user behavior data. As a result, several approaches have been tried to address these issues.

For example, laws, such as the European Union's General Data Protection Regulation (GDPR) provides legal schemes for addressing these challenges. For instance, the GDPR requires user consent prior to a website installing content, such as tracking cookies, on the user's computing device (e.g., user's web browser). However, users do not have control over which data is collected or receive any economic value for the use of their data by the tracking implementers or third-parties. Furthermore, terms of agreement for tracking user behavior are drafted by those implementing and reselling the tracked data, often in their own interests, without any benefit to the users. Additionally, users may attempt to address these issues via tracking blockers, which attempt to block tracking implementers from tracking their online behavior. However, such blockers typically only attempt to block pop-ups and other advertisements without providing the user granular control of consenting to certain types of tracking. Furthermore, such blockers fail to provide the user with any option for receiving economic value for their tracked data. As a result, there is not currently a means for protecting users from having their online behavior tracked without approval from the user while being compensated for the use of such data.

The embodiments of the present invention provide a means for protecting users from having their online behavior tracked without their approval while being compensated for the use of such data as discussed below in connection with FIGS. 3-5. FIG. 3 is a flowchart of a method for registering with the pre-authorization service provider to control the tracking of user behavior by the tracking implementer. FIG. 4 is a flowchart of a method for providing user control of tracking user behavior by tracking implementers. FIG. 5 is a flowchart of an alternative method for providing user control of tracking user behavior by tracking implementers.

Figure 3:
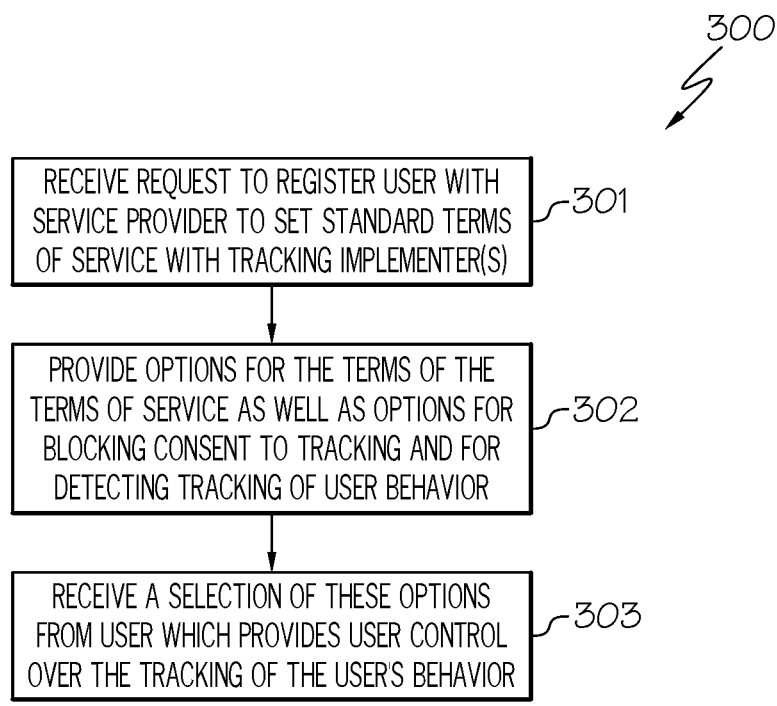
FIG. 3 is a flowchart of a method for registering with the pre-authorization service provider to control the tracking of user behavior by the tracking implementer in accordance with an embodiment of the present invention.

As stated above, FIG. 3 is a flowchart of a method 300 for registering with the pre-authorization service provider to control the tracking of user behavior by the tracking implementer in accordance with an embodiment of the present invention.

Referring to FIG. 3, in conjunction with FIGS. 1-2, in step 301, pre-authorization service provider 104 receives a request from user 101 to register with service provider 104 to set the standard terms of service with a tracking implementer(s). The standard terms of service provide economic value to user 101 for tracking the user's behavior as discussed below.

In step 302, pre-authorization service provider 104 provides options to user 101 for various terms of the terms of service with the tracking implementer as well as options for blocking consent to tracking and for detecting tracking of user behavior. In one embodiment, such options are presented to user 101 via a user interface on their computing device. In one embodiment, pre-authorization service provider 104 provides an application programming interface (API) to offer such options, including offering a standard set of terms acceptable to both the user and the tracking implementer provided by a validated representative, where the representative can be validated via the exchange of encrypted keys.

Examples of options provided to user 101 include various terms of service that may optionally be placed in the service agreement for allowing tracking of the user's behavior. For instance, user 101 may be presented with terms of service directed to different types and/or levels of financial compensation to user 101 for the use of user's data. "User's data," as used herein, refers to the data associated with the tracked user's behavior. "User's behavior," as used herein, refers to the actions performed by user 101, such as accessing various websites, using services provided by their computing device, interactions with their computing device to reach a goal or complete a task, interactions with the search engine, etc.

In another example, pre-authorization service provider 104 may present various standard service agreements to user 101 to select. For instance, user 101 may be presented with multiple service agreements for controlling the tracking of user's behavior, where each service agreement may have different terms of service, such as different types and/or levels of compensation, different types of data or user behavior being allowed to be tracked, etc. In one embodiment, such service agreements are utilized by multiple users 101 thereby positioning them to act as an economic bloc. In one embodiment, such service agreements are provided by government entities. In one embodiment, user 101 designates the tracking implementer(s) to be bound by the selected service agreements. In one embodiment, such designated tracking implementers and user-selected service agreements, upon which the designated tracking implementers are to be bound, are stored in a database 105 connected to pre-authorization service provider 104.

In another example, pre-authorization service provider 104 may present different options for blocking consent to tracking, such as automatically blocking the tracking of all user behavior if the tracking implementer has not previously agreed to the user's selected standard terms of service for tracking the user's behavior or automatically blocking the tracking of certain types of user behavior if the tracking implementer has not previously agreed to the user's selected standard terms of service for tracking the user's behavior.

In a further example, pre-authorization service provider 104 may present different options for detecting the tracking of user behavior, such as detecting a request from web server 102 to install content (e.g., tracking cookies) on the user's computing device 101 or detecting the installation of content from web server 102 in the user's local browser storage.

In one embodiment, pre-authorization service provider 104 may present the option to user 101 to enable tracking on a particular web or application property of a selected tracking implementer independent of any tracking being performed by that selected tracking implementer. In one embodiment, pre-authorization service provider 104 aggregates such information across all users 101 and makes it available in an anonymized fashion to tracking implementers as well as to users 101. Furthermore, in one embodiment, pre-authorization service provider 104 may optionally provide summary level tracking information to the end users 101 who opt in.

In step 303, pre-authorization service provider 104 receives a selection of these options from user 101 which provides user 101 control over the tracking of the user's behavior. In one embodiment, user 101 selects such options presented on a user interface of their computing device via standard means of selecting displayed elements on a display of the computing device, such as via a mouse, a keyboard, a touch on a touch screen, etc.

After registering with pre-authorization service provider 104 to control the tracking of user behavior by the tracking implementer, pre-authorization service provider 104 provides user control of tracking user behavior by tracking implementers after detecting a request from the tracking implementer to install content (e.g., tracking cookies) on the user's computing device 101 to track user behavior as discussed below in connection with FIG. 4.

Figure 4:
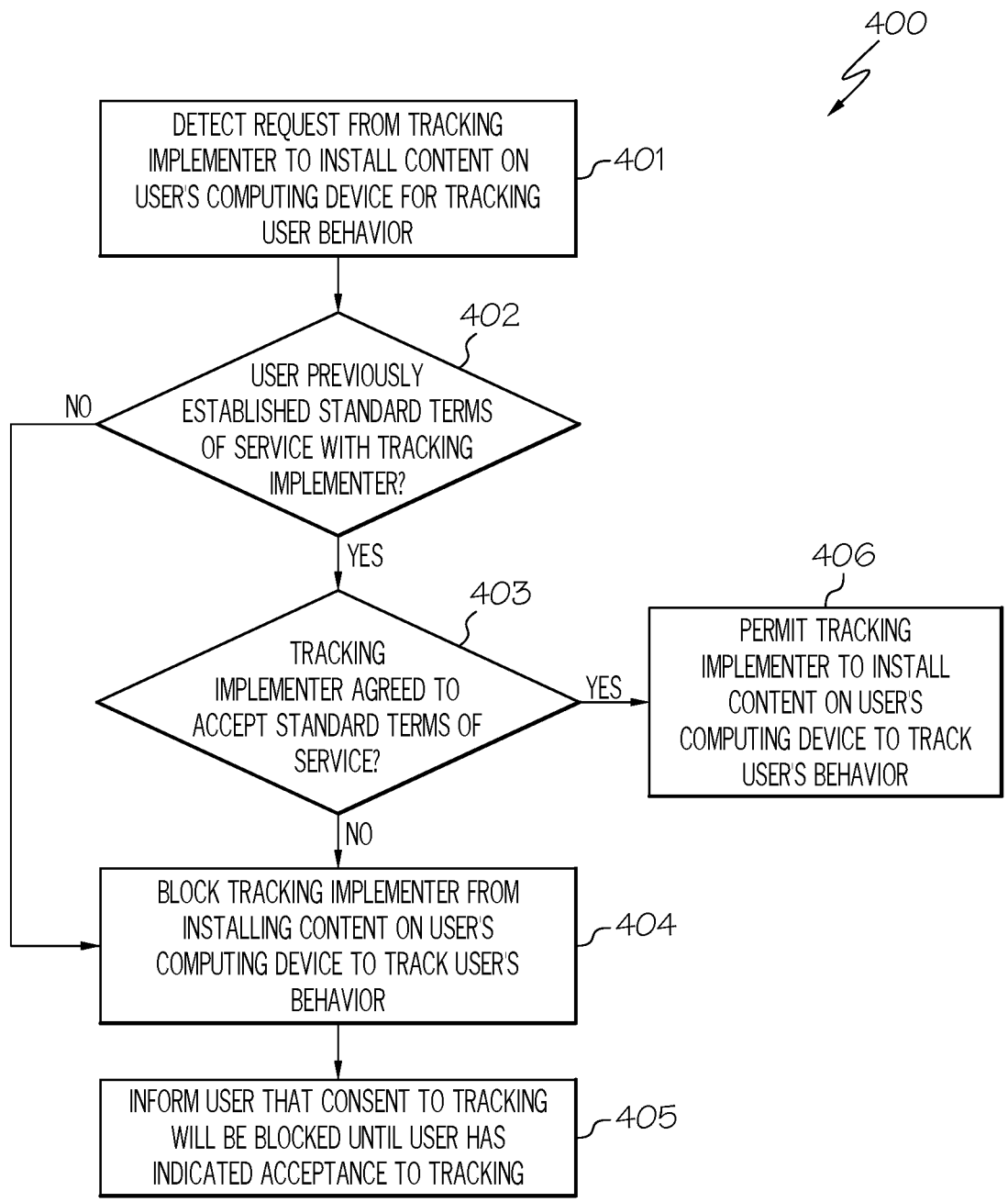
FIG. 4 is a flowchart of a method for providing user control of tracking user behavior by tracking implementers in accordance with an embodiment of the present invention.

FIG. 4 is a flowchart of a method 400 for providing user control of tracking user behavior by tracking implementers in accordance with an embodiment of the present invention.

Referring to FIG. 4, in conjunction with FIGS. 1-3, in step 401, pre-authorization service provider 104 detects a request from a tracking implementer to install content (e.g., tracking cookies) on the user's computing device 101 (e.g., web browser) for tracking user behavior. A "tracking implementer," as used herein, refers to any entity (e.g., website, content provider, marketing provider) configured with the ability to track online user behavior via any means, such as via tracking cookies or storing online behavior on the user's local browser storage to be later retrieved by the tracking implementer. As discussed above, "user behavior," as used herein, refers to the actions performed by user 101, such as accessing various websites, using services provided by their computing device, interactions with their computing device to reach a goal or complete a task, interactions with the search engine, etc.

In one embodiment, the request to install content on the user's computing device 101 for tracking user behavior is detected by pre-authorization service provider 104 by detecting the request for consent to the installation of a tracking cookie on the user's computing device 101 by the tracking implementer. In such situations, a banner may appear on the user interface of the user's computing device explaining the purposes of collection and requesting consent to the installation of such cookies.

In step 402, a determination is made by pre-authorization service provider 104 as to whether user 101 has previously established standard terms of service with the tracking implementer, such as the specific website that is requesting to install tracking cookies on the user's computing device 101. For example, user 101 may have previously registered with pre-authorization service provider 104 to select a particular service agreement to govern the tracking of user behavior by a designated tracking implementer, such as stipulating the different types of data or user behavior being allowed to be tracked, the type and/or level of compensation, etc. In one embodiment, such information (a listing of tracking implementers and the user-selected service agreements to dictate the terms of tracking by such tracking implementers) is stored in database 105.

If user 101 has previously established standard terms of service with the tracking implementer, then, in step 403, a determination is made by pre-authorization service provider 104 as to whether the tracking implementer agreed to accept such standard terms of service.

If the tracking implementer did not accept such standard terms of service or if the user had not previously established standard terms of service with the tracking implementer, then, in step 404, pre-authorization service provider 104 blocks the tracking implementer from installing content (e.g., tracking cookies) on the user's computing device 101 (e.g., web browser) to track the user's behavior. In this manner, the present invention provides user 101 control over tracking the user's behavior, such as by blocking the tracking of user's behavior until the tracking implementer agrees to the terms that are satisfactory to the user, such as limiting the types of actions to be tracked, compensating the user for acquiring personal data associated with such tracking, etc.

In step 405, pre-authorization service provider 104 informs user 101, such as via a user interface on computing device 101, that consent to the tracking will be blocked until user 101 has indicated acceptance to the tracking.

Referring to step 403, if, however, the tracking implementer did accept the standard terms of service for tracking user behavior that was previously selected by user 101, then, in step 406, pre-authorization service provider 104 permits the tracking implementer to install content (e.g., tracking cookies) on the user's computing device 101 to track the user's behavior. In one embodiment, pre-authorization service provider 104 keeps track of the tracking implementers who consented to the appropriate terms of service for tracking user behavior. In one embodiment, pre-authorization service provider 104 makes such information available via an application programming interface (API) to the users whose online behavior is being tracked so that they can be compensated by external systems, either monetarily or via bartered value, for the use of data obtained from tracking their online behavior.

Alternatively, some tracking implementers may not issue a request to install content to track user behavior prior to installing such content. The present invention provides user control of tracking the user's behavior in such a situation as discussed below in connection with FIG. 5.

Figure 5:
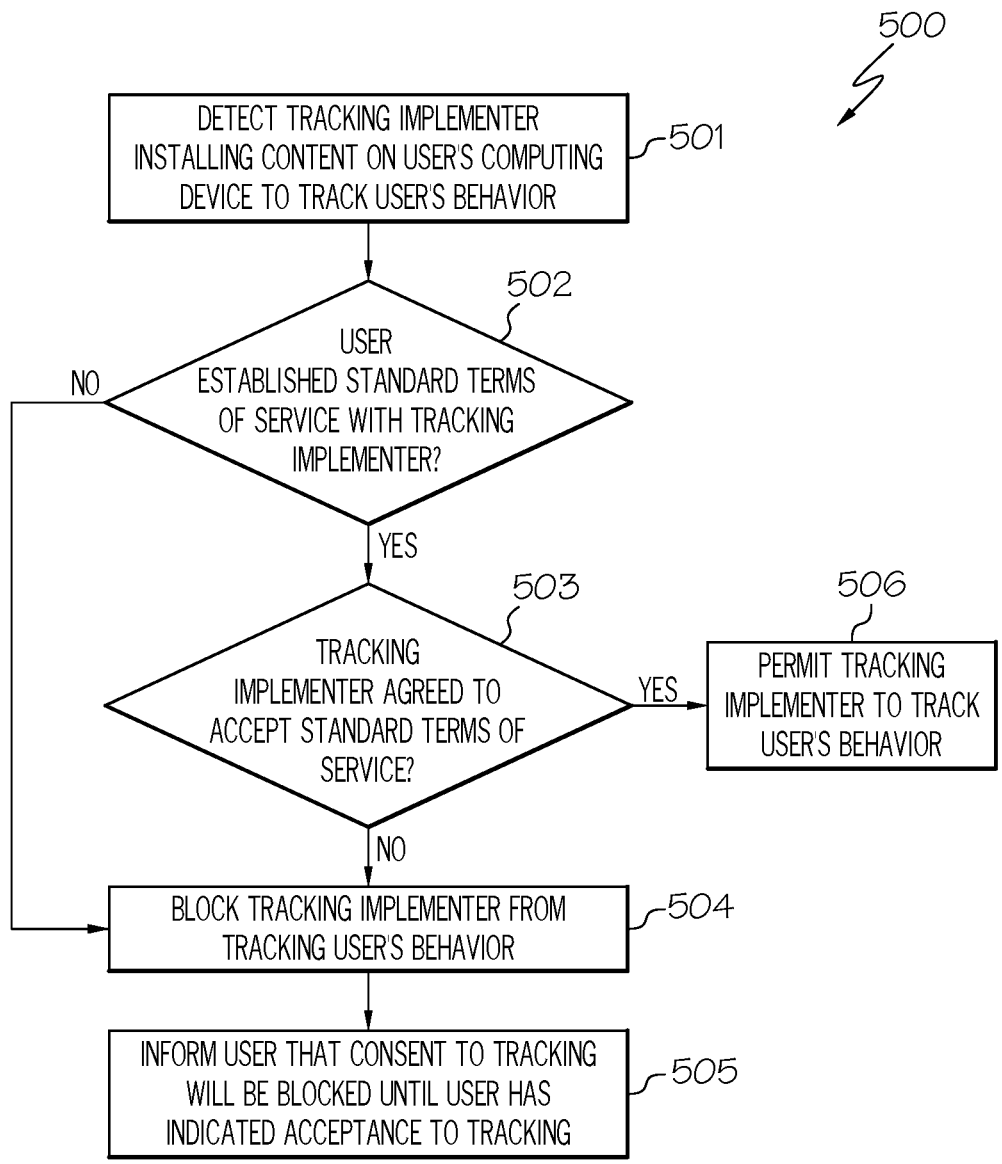
FIG. 5 is a flowchart of an alternative method for providing user control of tracking user behavior by tracking implementers in accordance with an embodiment of the present invention.

FIG. 5 is a flowchart of an alternative method 500 for providing user control of tracking user behavior by tracking implementers in accordance with an embodiment of the present invention.

Referring to FIG. 5, in conjunction with FIGS. 1-3, in step 501, pre-authorization service provider 104 detects the tracking implementer (e.g., website) installing content (e.g., tracking cookies) on the user's computing device 101 to track the user's behavior.

In one embodiment, pre-authorization service provider 104 detects the installation of content (e.g., tracking cookies) on the user's computing device 101 to track user behavior by comparing and logging content differences on the user's computing device 101, such as the content stored in the user's web browser, over a period of time.

In another embodiment, pre-authorization service provider 104 detects the installation of content (e.g., tracking cookies) on the user's computing device 101 to track user behavior by using a machine learning algorithm based on a mathematical model of various means of tracking implementers tracking user behavior. In one embodiment, the machine learning algorithm builds a mathematical model of data, known as "training data," of instances of where tracking implementers have installed content on a computing device to track user behavior. Via the use of such a model, the machine learning algorithm is able to make predictions or decisions as to whether a tracking implementer has installed content on a computing device to track user behavior.

For instance, in one embodiment, functional programs (programs essential for proper functioning of website) and tracking programs (programs for tracking) are classified based on syntactic and semantic features extracted from a number of programs. In one embodiment, two-class support vector machine (SVM) trained on labelled data from both functional and tracking programs can accurately distinguish these programs. In one embodiment, one-class machine learning classifiers, such as one-class SVM and positive and unlabeled (PU) learning, trained using only tracked programs may also be utilized and achieve similar performance comparable to two-class SVM.

After training the machine learning algorithm to identify tracking programs, the machine learning algorithm will be able to identify such tracking programs which install content (e.g., tracking cookies) on the user's computing device 101 to track user behavior.

In step 502, a determination is made by pre-authorization service provider 104 as to whether user 101 has previously established standard terms of service with the tracking implementer, such as the specific website who was detected in installing content on the user's computing device 101 to track user behavior. For example, user 101 may have previously registered with pre-authorization service provider 104 to select a particular service agreement to govern the tracking of user behavior by a designated tracking implementer, such as stipulating the different types of data or user behavior being allowed to be tracked, the type and/or level of compensation, etc. In one embodiment, such information (a listing of tracking implementers and the user-selected service agreements to dictate the terms of tracking by such tracking implementers) is stored in database 105.

If user 101 has previously established standard terms of service with the tracking implementer, then, in step 503, a determination is made by pre-authorization service provider 104 as to whether the tracking implementer agreed to accept such standard terms of service.

If the tracking implementer did not accept such standard terms of service or if the user had not previously established standard terms of service with the tracking implementer, then, in step 504, pre-authorization service provider 104 blocks the tracking implementer from tracking the user's online behavior, such as by blocking the execution of code or deleting the installed content (e.g., tracking cookies) on the user's computing device 101. In this manner, the present invention provides user 101 control over tracking the user's behavior, such as by blocking the tracking of user's behavior until the tracking implementer agrees to the terms that are satisfactory to the user, such as limiting the types of actions to be tracked, compensating the user for acquiring personal data associated with such tracking, etc.

In step 505, pre-authorization service provider 104 informs user 101, such as via a user interface on computing device 101, that consent to the tracking will be blocked until user 101 has indicated acceptance to the tracking.

Referring to step 503, if, however, the tracking implementer did accept the standard terms of service for tracking user behavior that was previously selected by user 101, then, in step 506, pre-authorization service provider 104 permits the tracking implementer to track the user's behavior. In one embodiment, pre-authorization service provider 104 keeps track of the tracking implementers who consented to the appropriate terms of service for tracking user behavior. In one embodiment, pre-authorization service provider 104 makes such information available via an application programming interface (API) to the users whose online behavior is being tracked so that they can be compensated by external systems, either monetarily or via bartered value, for the use of data obtained from tracking their online behavior.

As discussed above, embodiments of the present invention provide the means for protecting users from having their online behavior tracked without their approval while being compensated for the use of such data. Embodiments of the present invention provide the means for the user to control the tracking of user behavior while also being compensated for the use of data acquired from such tracking.

Furthermore, the present invention improves the technology or technical field involving tracking user behavior. As discussed above, tracked user behavior data may be utilized by the tracking implementers or third-parties to help businesses make effective decisions about advertising and outreach to the user, such as presenting targeted advertisements to the user. Tracked user behavior data may be resold, repackaged and reintegrated in ways that are unexpected and opaque to the users, who may not agree to such actions if they understood how their data was being used. To some users, such practices are an invasion of privacy. Furthermore, economic benefits primarily accrue to those implementing tracking with users having little knowledge of the economic value of their data to those who implement tracking or purchase the tracked user behavior data. As a result, several approaches have been tried to address these issues. However, each of these approaches has been unsuccessful in protecting users from having their online behavior tracked without approval from the user while being compensated for the use of such data.

The present invention improves such technology by enabling users to protect their online behavior from being tracked without approval from the user while being compensated for the use of such data. In this manner, there is an improvement in the technical field of tracking user behavior.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing user control of tracking user behavior, the method comprising:
    detecting a request from a tracking implementer to install content on a user's computing device, wherein said installed content is used to track user behavior;
    determining whether said tracking implementer previously agreed to accept a standard terms of service for tracking said user behavior in response to user previously establishing said standard terms of service for tracking said user behavior by said tracking implementer;
    blocking said tracking implementer from installing content on said user's computing device in response to said tracking implementer not previously agreeing to accept said standard terms of service for tracking said user behavior; and
    permitting said tracking implementer to install content on said user's computing device in response to said tracking implementer previously agreeing to accept said standard terms of service for tracking said user behavior.

2. The method as recited in claim 1, wherein said standard terms of service comprises providing economic value to said user for tracking said user behavior.

3. The method as recited in claim 1 further comprising:
    blocking said tracking implementer from installing content on said user's computing device in response to said user not previously establishing said standard terms of service for tracking said user behavior by said tracking implementer.

4. The method as recited in claim 1 further comprising:
    informing said user that consent to tracking will be blocked until said user has indicated acceptance to tracking in response to blocking said tracking implementer from installing content on said user's computing device.

5. The method as recited in claim 1 further comprising:
    receiving a request from said user to register said user with a service provider to establish said standard terms of service for tracking said user behavior by said tracking implementer; and
    providing options to said user for terms of said standard terms of service with said tracking implementer as well as options for blocking consent to tracking and for detecting tracking of said user behavior.

6. The method as recited in claim 1, wherein said installed content comprises a tracking cookie.

7. The method as recited in claim 1, wherein said tracking implementer comprises a website.

8. A computer program product for providing user control of tracking user behavior, the computer program product comprising a computer readable storage medium having program code embodied therewith, the program code comprising the programming instructions for:
    detecting a request from a tracking implementer to install content on a user's computing device, wherein said installed content is used to track user behavior;
    determining whether said tracking implementer previously agreed to accept a standard terms of service for tracking said user behavior in response to user previously establishing said standard terms of service for tracking said user behavior by said tracking implementer;
    blocking said tracking implementer from installing content on said user's computing device in response to said tracking implementer not previously agreeing to accept said standard terms of service for tracking said user behavior; and
    permitting said tracking implementer to install content on said user's computing device in response to said tracking implementer previously agreeing to accept said standard terms of service for tracking said user behavior.

9. The computer program product as recited in claim 8, wherein said standard terms of service comprises providing economic value to said user for tracking said user behavior.

10. The computer program product as recited in claim 8, wherein the program code further comprises the programming instructions for:
    blocking said tracking implementer from installing content on said user's computing device in response to said user not previously establishing said standard terms of service for tracking said user behavior by said tracking implementer.

11. The computer program product as recited in claim 8, wherein the program code further comprises the programming instructions for:
    informing said user that consent to tracking will be blocked until said user has indicated acceptance to tracking in response to blocking said tracking implementer from installing content on said user's computing device.

12. The computer program product as recited in claim 8, wherein the program code further comprises the programming instructions for:
    receiving a request from said user to register said user with a service provider to establish said standard terms of service for tracking said user behavior by said tracking implementer; and
    providing options to said user for terms of said standard terms of service with said tracking implementer as well as options for blocking consent to tracking and for detecting tracking of said user behavior.

13. The computer program product as recited in claim 8, wherein said installed content comprises a tracking cookie.

14. The computer program product as recited in claim 8, wherein said tracking implementer comprises a website.

15. A method for providing user control of tracking user behavior, the method comprising:

detecting a tracking implementer installing content on a user's computing device to track user behavior;

determining whether said tracking implementer previously agreed to accept a standard terms of service for tracking said user behavior in response to user previously establishing said standard terms of service for tracking said user behavior by said tracking implementer;

blocking said tracking implementer from tracking said user behavior in response to said tracking implementer not previously agreeing to accept said standard terms of service for tracking said user behavior; and permitting said tracking implementer to track said user behavior in response to said tracking implementer previously agreeing to accept said standard terms of service for tracking said user behavior.

16. The method as recited in claim 15, wherein said standard terms of service comprises providing economic value to said user for tracking said user behavior.

17. The method as recited in claim 15 further comprising:

blocking said tracking implementer from tracking said user behavior in response to said user not previously establishing said standard terms of service for tracking said user behavior by said tracking implementer.

18. The method as recited in claim 15 further comprising:

informing said user that consent to tracking will be blocked until said user has indicated acceptance to tracking in response to blocking said tracking implementer from tracking said user behavior.

19. The method as recited in claim 15 further comprising:

detecting said tracking implementer installing content on said user's computing device to track user behavior by comparing and logging content differences on said user's computing device over a period of time.

20. The method as recited in claim 15 further comprising:

detecting said tracking implementer installing content on said user's computing device to track user behavior by using a machine learning algorithm based on a mathematical model of various means of tracking implementers tracking user behavior.

\* \* \* \* \*